United States Patent
Arora et al.

(10) Patent No.: US 12,019,610 B2
(45) Date of Patent: Jun. 25, 2024

(54) MECHANISMS FOR TRUNCATING TENANT DATA

(71) Applicant: salesforce.com, inc., San Francisco, CA (US)

(72) Inventors: Vaibhav Arora, San Francisco, CA (US); Terry Chong, Pleasanton, CA (US); Thomas Fanghaenel, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 117 days.

(21) Appl. No.: 17/458,591

(22) Filed: Aug. 27, 2021

(65) Prior Publication Data

US 2023/0060733 A1 Mar. 2, 2023

(51) Int. Cl.
| | | |
|---|---|---|
| *G06F 16/23* | (2019.01) | |
| *G06F 12/02* | (2006.01) | |
| *G06F 12/0815* | (2016.01) | |
| *G06F 16/22* | (2019.01) | |
| *G06F 16/2455* | (2019.01) | |

(52) U.S. Cl.
CPC ...... *G06F 16/2358* (2019.01); *G06F 12/0269* (2013.01); *G06F 12/0815* (2013.01); *G06F 16/2282* (2019.01); *G06F 16/2308* (2019.01); *G06F 16/24552* (2019.01)

(58) Field of Classification Search
CPC .............. G06F 16/2358; G06F 16/2282; G06F 16/2308; G06F 16/24552; G06F 12/0269; G06F 12/0815
See application file for complete search history.

(56) References Cited

U.S. PATENT DOCUMENTS

| | | | |
|---|---|---|---|
| 7,512,705 B2 | 3/2009 | Mogul | |
| 8,732,157 B2 | 5/2014 | Weissman et al. | |
| 9,558,218 B2 | 1/2017 | Dutta et al. | |
| 11,327,962 B1* | 5/2022 | Borthakur | G06F 16/2358 |
| 2008/0244184 A1* | 10/2008 | Lewis | G06F 16/24552 711/130 |
| 2012/0054444 A1* | 3/2012 | Wang | G06F 16/27 711/E12.001 |
| 2017/0116124 A1* | 4/2017 | Sundaravaradan | G06F 12/0888 |
| 2017/0116130 A1* | 4/2017 | Sundaravaradan | G06F 16/2453 |

(Continued)

*Primary Examiner* — Brittany N Allen
*Assistant Examiner* — William P Bartlett
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to truncating a tenant's data from a table. A database node may maintain a multi-tenant table having records for tenants. Maintaining the table may include writing a record for a tenant into an in-memory cache and performing a flush operation to flush the record to a shared storage. The database node may write a truncate record into the in-memory cache that truncates a tenant from the table such that records of the tenant having a timestamp indicating a time before the truncate record cannot be accessed as part of a record query. While the truncate record remains in the in-memory cache, the database node may receive a request to perform a record query for a key of the tenant, make a determination on whether a record was committed for the key after the truncate record was committed, and return a response based on the determination.

18 Claims, 11 Drawing Sheets

(56) References Cited

U.S. PATENT DOCUMENTS

| | | | |
|---|---|---|---|
| 2019/0108104 A1* | 4/2019 | Gupta | G06F 16/2358 |
| 2019/0108137 A1* | 4/2019 | Ray | G06F 12/121 |
| 2019/0229897 A1* | 7/2019 | Verrall | H04L 9/0836 |
| 2019/0236156 A1* | 8/2019 | Fanghaenel | G06F 16/172 |
| 2019/0332544 A1* | 10/2019 | Jia | G06F 12/1045 |
| 2020/0097205 A1* | 3/2020 | Fanghaenel | G06F 3/0671 |
| 2020/0097558 A1* | 3/2020 | Fanghaenel | G06F 16/2246 |
| 2021/0073189 A1 | 3/2021 | Martin et al. | |

\* cited by examiner

MECHANISMS FOR TRUNCATING TENANT DATA

BACKGROUND

Technical Field

This disclosure relates generally to database systems and more specifically, to a process for truncating a tenant's data from a table.

Description of the Related Art

Modern database systems routinely implement management systems that enable users to store a collection of information in an organized manner that can be efficiently accessed and manipulated. That information is often stored in database records that correspond to rows of a database table that is composed of columns and rows in which each column defines a grouping of information (e.g., last names). In some implementations, the database records are pushed to a key-value storage organized as a log-structured merge tree (LSM tree) having multiple levels that each store records. During operation, the database system initially writes records into an in-memory cache before later flushing them to the key-value storage.

DETAILED DESCRIPTION

Figure 1:
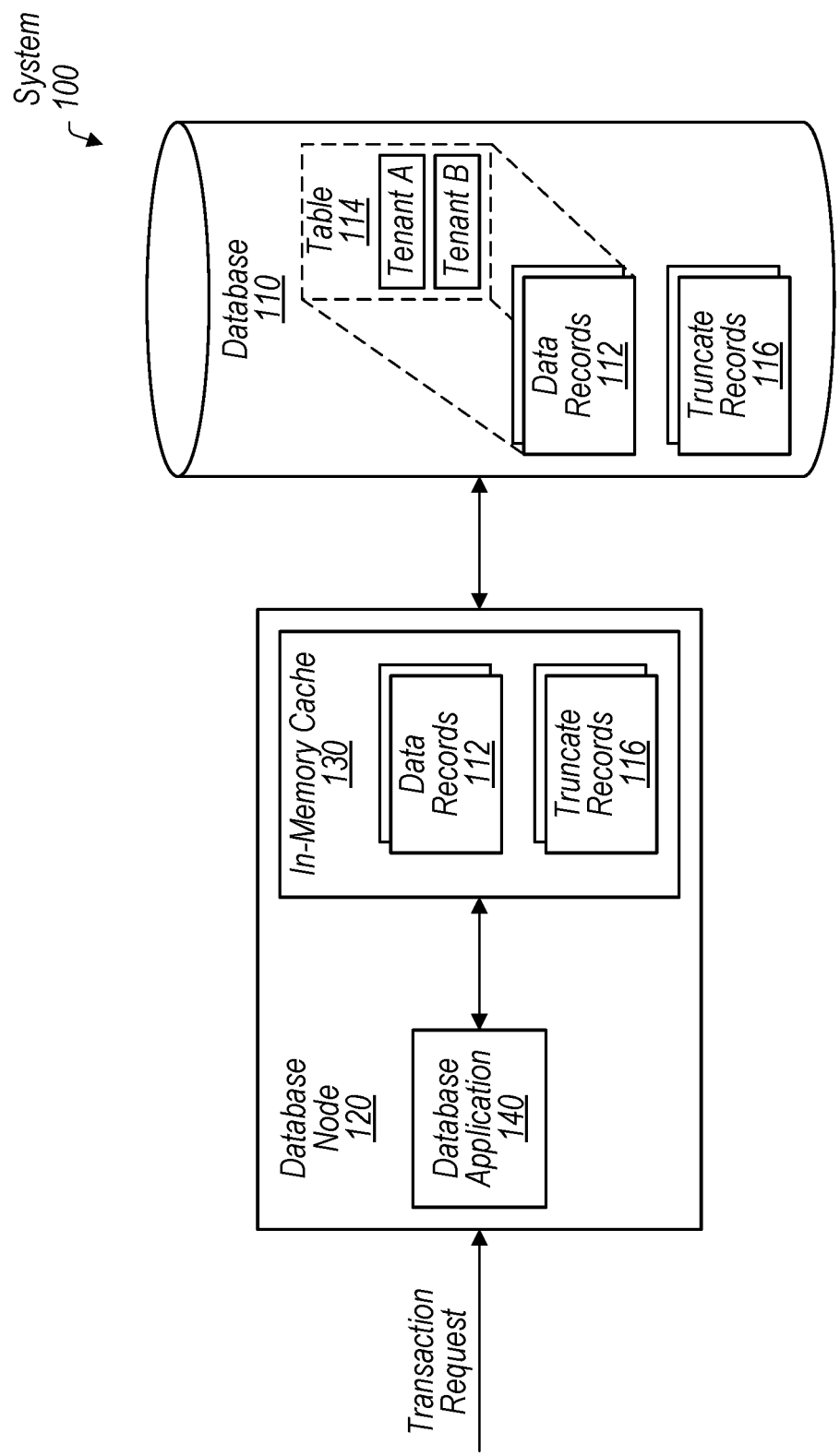
FIG. 1 is a block diagram illustrating example elements of a system having a database node and a database, according to some embodiments.

In some implementations, a database system can store records for multiple tenants (e.g., users, organizations, etc.) in the same table (referred to as a "multi-tenant" table). The records of a tenant normally include a tenant identifier (or another marker) that logically separates their records from the records of other tenants in the table. In certain cases, it is desirable to truncate some or all records of a tenant from a multi-tenant table without impacting other tenants. As used herein, the term "truncate" is used to refer to removing data from a table without removing the table itself, in accordance with its well-understood meaning in the computing field. Thus, to truncate a tenant from a table means to remove the tenant's data from that table. It may be desirable to truncate a tenant from a multi-tenant table if the tenant is no longer using the table or if the tenant wishes to free up space to insert new records into the table.

One approach for truncating a tenant from a multi-tenant table is for the database system to traverse the records of the table, removing those records having the tenant's identifier. This approach, however, can involve many database operations and thus can have a profound impact on other tenants. Another approach is for the database system to generate a truncate record. A truncate record is a record that signifies the truncation of the tenant from a table. Significantly, a truncate record may be written to a table at a first point in time, with the to-be-truncated data removed at a later point in time. The database system writes a truncate record into an in-memory cache and later flushes the truncate record to the database. Accesses to the multi-tenant table for the tenant observe the truncate record at the database and do not return records that have been truncated. In prior implementations, however, while the truncate record is located in the in-memory cache, additional records cannot be written for the tenant into the multi-tenant table until the truncate record is flushed from the in-memory cache to the database. In many cases, the in-memory cache is not flushed until it becomes full, which can take a considerable amount of time. As a result, the truncated tenant may not be permitted to write new records to the multi-tenant table for a considerable amount of time. The present disclosure addresses, among other things, the problem of how to truncate a tenant from a table without the tenant having to wait for a truncate record to be flushed from an in-memory cache to a database before the tenant can write new records into the table.

In various embodiments described below, a system includes a database that stores a set of records for multi-tenant tables and a database node that includes an in-memory cache. The database node, in various embodiments, processes database transactions that involve writing records for multi-tenant tables into the in-memory cache and later flushing those records to the database. During operation, the database node may receive a request to truncate a tenant from a multi-tenant table. In response to that request, the database node writes a truncate record into the in-memory cache, thus signifying a truncation of the tenant from the multi-tenant table. Prior to flushing the truncate record, the database node may receive a request to perform a transaction that includes reading one or more records for the tenant from the multi-tenant table. In various embodiments, the database node implements mechanisms that can observe truncate records in the in-memory cache and can process transactions in view of the truncate records. Accordingly, when attempting to access one or more records for the transaction, the database node may first check if there is a truncate record present in the in-memory cache and obtain the latest truncate record for the appropriate tenant. The database node may determine whether a requested record was committed after the truncate record was committed. If a requested record is found but was committed before the truncate record, then the database node does not return that record to the requestor; otherwise, the database node can return the record. By checking for a truncate record and then accessing the records, the database node is safeguarded against returning records that have been truncated. Because the database node performs this check, in various embodiments, the database node can write records for a tenant to a multi-tenant table without having to flush a committed truncate record from the in-memory cache.

After a flush has been performed to copy the records from the in-memory cache to the database, in various embodiments, the database node performs a purge to remove those records from the in-memory cache. During a purge, in various embodiments, the truncated records are removed prior to the truncate records. This may ensure that a given transaction does not access a record that has been truncated, which could happen if the truncate record is removed prior to the truncated record as that record would become visible again and accessible as a result. The database node may further wait to purge a truncate record until all running queries that started at the database node before the truncate record was committed have finished. These techniques may be advantageous as they may allow for new records to be written for a truncated tenant to a multi-tenant table without having to wait for an associated truncate record to be flushed from the in-memory cache. That is, these techniques allow for truncate records to be observed in the in-memory cache and thus a database node does not have to wait for the truncate records to be removed before it can read and/or write records for the corresponding truncated tenant to the multi-tenant table. As a result, the records of a tenant can be truncated from a table using an operation that can be performed in constant time without impacting the other tenants that have records in that table.

Turning now to FIG. 1, a block diagram of a system 100 is shown. System 100 includes a set of components that may be implemented via hardware or a combination of hardware and software. As shown in the illustrated embodiment, system 100 includes a database 110 and a database node 120. As further shown, database 110 includes database records 112 for a table 114 and truncate records 116, and database node 120 includes a database application 140 and an in-memory cache 130 storing data records 112 and truncate records 116. System 100 may be implemented differently. As an example, system 100 might include multiple database nodes 120 that process transactions to read and write records.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database 110), and other entities of system 100. In various embodiments, system 100 is implemented using a cloud infrastructure that is provided by a cloud provider. Database 110 and database node 120 may thus execute on and utilize the available cloud resources of the cloud infrastructure (e.g., computing resources, storage resources, network resources, etc.) to facilitate their operation. As an example, database node 120 may execute within a virtual environment hosted on server-based hardware included within a datacenter of the cloud provider. But in some embodiments, system 100 is implemented using a local or private infrastructure as opposed to a public cloud.

Database 110, in various embodiments, is a collection of information that is organized in a manner that allows for access, storage, and manipulation of that information. Accordingly, database 110 may include supporting software (e.g., storage nodes) that enable database node 120 to carry out operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. Information (e.g., data records 112) that is written to database 110 by a database node 120 may be accessible to other database nodes 120 within a multi-node configuration. As depicted, database 110 stores data records 112 and truncate records 116.

A data record 112, in various embodiments, is a key-value pair comprising data and a corresponding key that can be used to look up that record 112. For example, a data record 112 may correspond to a data row in a table 114 and specify values for one or more attributes/fields of that table 114. One or more of the attributes/fields may be used to define a key for accessing that data record 112 from database 110 and/or in-memory cache 130. In various embodiments, data records 112 are immutable and thus to update the underlying database construct (e.g., a row within a table 114), a new data record 112 is written. Consequently, a database construct may be associated with multiple data records 112, each of which is a different version of that database construct. The data records 112 can be referred to as "record versions" of the database construct. As an example, a first data record 112 (a first record version) may initially be written that stores certain values for a database row and later a second data record 112 (a second record version) may be written that updates one or more of the values of the database row. Those two records 112 may be accessible using the same key.

A table 114, in various embodiments, is a database object having a set of data records 112—that set of data records 112 may be an empty set. While database tables are discussed, in some embodiments, other database objects may be used, such as a document in a non-relational database. In various embodiments, a table 114 can include data records 112 for multiple tenants of system 100. As depicted for example, the illustrated table 114 includes data records 112 for two tenants: tenant A and tenant B. To logically separate tenants in a multi-tenant table 114, a data record 112 may specify a tenant identifier that identifies the tenant of that data record 112. In some cases, that tenant identifier may be a part of a longer value that also identifies the table 114 that includes that data record 112. Accordingly, to locate a data record 112, database node 120 may be provided with a database key that specifies a table 114 and a tenant associated with that data record 112. In some embodiments, the underlying data records 112 of a tenant in the same multi-tenant table 114 are clustered together at database 110.

A truncate record 116, in various embodiments, is a record that causes a set of records of a specified keyspace to be truncated. When truncating a tenant (e.g., tenant A) from a table 114, database node 120 may write a truncate record 116 specifying a keyspace encompassing the tenant's records within that table 114. Once a truncate record 116 has been committed, in various embodiments, the query mechanisms of database node 120 observe the truncate record 116 and thus do not return truncated data records 112. But those data records 112 may remain in system 100 for a period of time (e.g., until they are purged by a background process cleaning up database 110). In some cases, the truncated data records 112 are not purged from database 110—that is, the data records 112 are logically dropped from a table 114 but physically remain in database 110. In various embodiments, multiple truncate records 116 can be written for the tenant of the same table 114. In such cases, database node 120 may observe the latest truncate record 116. A truncate record 116 is discussed in greater detail with respect to FIG. 2.

Database node 120, in various embodiments, provides database services, such as data storage, data retrieval, and/or data manipulation. In various embodiments, a database node 120 is software that is executable on hardware, while in some embodiments, it encompasses both the hardware and the software. The database services may be provided to other components in system 100 or to components external to system 100. For example, a database node 120 may receive a transaction request from an application node (not illustrated) to perform a database transaction. A database transaction, in various embodiments, is a logical unit of work (e.g., a specified set of database operations) to be performed in relation to database 110. For example, processing a database transaction may include executing a SQL SELECT command to select one or more rows from one or more tables 114. The contents of a row may be specified in a data record 112 and therefore database node 120 may return one or more data records 112 that correspond to the one or more rows. Performing a database transaction can include database node 120 writing data records 112 and/or truncate records 116 to database 110. Database node 120, in various embodiments, initially writes records to in-memory cache 130 before flushing them to database 110 after they have been committed. As used herein, the phrase "committing a transaction" or "committing a record" is used in accordance with its well-understood meaning and refers to the process of causing changes made during the transaction to be saved and made visible outside of the entity performing the transaction.

In-memory cache 130, in various embodiments, is a buffer that stores data in memory (e.g., random access memory) of database node 120. HBase™ memstore is an example of an in-memory cache 130. In various embodiments, data records 112 and/or truncate records 116 are stored in files as part of a log-structured merge tree (LSM tree) data structure that organizes the files using a level-based scheme. The LSM tree may comprise two high-level components: an in-memory component implemented at in-memory cache 130 and an on-disk component implemented at database 110. In some embodiments, in-memory cache 130 is considered to be separate component from the LSM tree. In various embodiments, database node 120 initially writes records into its in-memory caches 130. As cache 130 becomes full and/or at particular points in time, database node 120 may flush records from cache 130 to database 110. As a part of flushing those records, in various embodiments, database nodes 120 writes them into a set of new LSM files at database 110.

Database application 140, in various embodiments, is software executable to provide the database services of database node 120. Database application 140 may process transactions according to a set of guiding principles that ensure transactional consistency. One example of a set of guiding principles is ACID (Atomicity, Consistency, Isolation, and Durability). ACID seeks to guarantee that all of a transaction succeeds or none of it, ensure that data is consistent, guarantee that transactions occur in isolation, and ensure that, once a transaction is committed, it will exist within the system. Accordingly, in various embodiments, database application 140 implements mechanisms that enable a tenant to be truncated from a table 114 and then for data records 112 to be written to the table 114 for the tenant and accessed without flushing a truncate record 116 and without breaking the guiding principles and causing an inconsistent database. As discussed in greater detail with respect to FIG. 3A, when accessing a set of data records 112 for a transaction, database application 140 observes a truncate record 116 in in-memory cache 130 so as to not return truncated data records 112. As discussed in greater detail with respect to FIG. 3B, database application 140 can write multiple truncate records 116 for the same table 114 and tenant and observe all those truncate records 116. As discussed in greater detail with respect to FIG. 3C, database application 140 can observe a truncate record 116 to determine if it is permitted to write a data record 112 having the same key as a data record 112 that is present within in-memory cache 130. As discussed in greater detail with respect to FIG. 3D, database application 140 can ensure that a transaction is not performed across a truncate boundary such that the transactional consistency of a truncate is broken.

Figure 2:
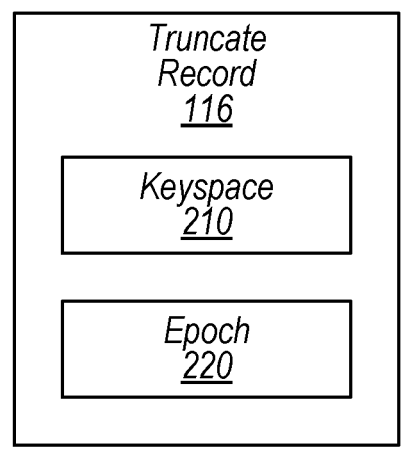
FIG. 2 is a block diagram illustrating example elements of a truncate record, according to some embodiments.

Turning now to FIG. 2, a block diagram of an example truncate record 116 is shown. In the illustrated embodiment, truncate record 116 specifies a keyspace 210 and an epoch 220. In some embodiments, a truncate record 116 is implemented differently than shown.

Keyspace 210, in various embodiments, corresponds to a range of database keys. For example, keyspace 210 might specify the range of keys from "AAAAA" to "EEEEE". In some embodiments, keyspace 210 can correspond to different key ranges (e.g., from "AAAAA" to "BBBBB" and from "CCCCC" to "EEEEE"). In various embodiments, a tenant is associated with a certain key range within a table 114. In particular, a key may comprise multiple portions: a table identifier, a tenant identifier, and a record identifier. Consequently, keyspace 210 may specify the table identifier and the tenant identifier of the tenant being truncated, encompassing all keys having the prefix, e.g., "table/tenant/". In some embodiments, a mapping is maintained between a tenant and its key range within the corresponding table 114. Accordingly, keyspace 210 may specify that key range without identifying the tenant and/or that table 114.

Epoch 220, in various embodiments, identifies a time period within system 100. System 100 may maintain a transaction commit number (XCN) that is incremented over time and thus may be used to represent the progression of time in system 100. In particular, when a database transaction is being committed, the records written for the database transaction may be stamped with an XCN. A record committed earlier in time is stamped with an XCN that has a smaller numerical value than the XCN of a record committed at a later time. As a result, by looking at the XCNs of a set of records, database application 140 can determine the order in time in which the records were committed. In various embodiments, epoch 220 is an XCN. As discussed in more detail below, database application 140 can use epoch 220 to determine which data records 112 were committed before a truncate record 116 and which data records 112 were committed after.

Figure 3A:
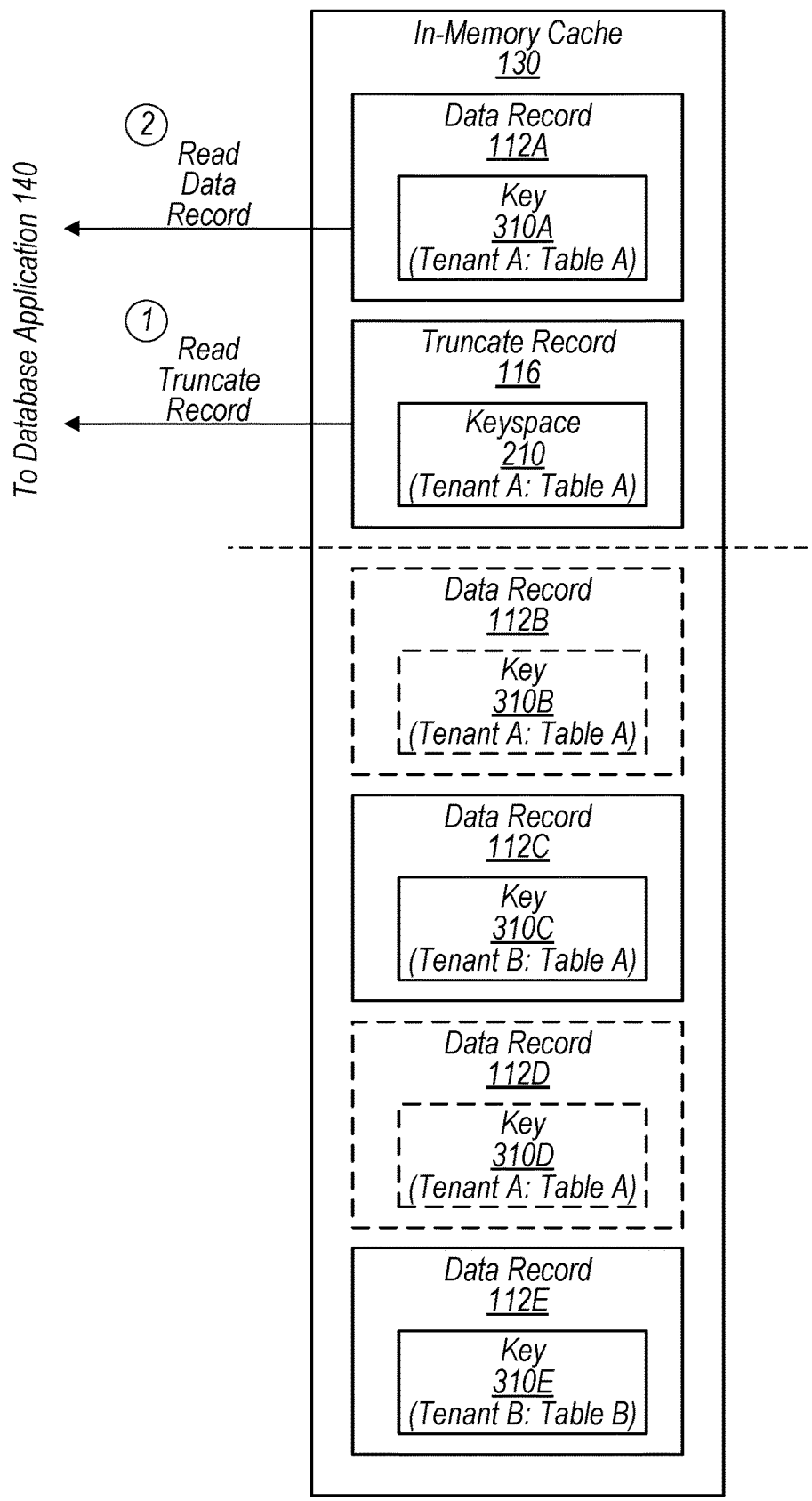
FIG. 3A is a block diagram illustrating example elements of an interaction in which a database application of the database node reads a data record from an in-memory cache of the database node, according to some embodiments.

Turning now to FIG. 3A, a block diagram of an example interaction in which database application 140 reads a data record 112 from in-memory cache 130 is shown. In the illustrated embodiment, in-memory cache 130 stores data records 112A-E and a truncate record 116. As further shown, data records 112A-E each have a respective key 310 that identifies a tenant and a table 114 associated with that data record 112. In various cases, the respective keys 310 also identify a record identifier for their corresponding data record 112, although this is not depicted in order to simply FIG. 3A. Also as shown, truncate record 116 has a keyspace 210 that specifies tenant "A" and table "A" and truncates data records 112B and 112D.

For purposes of facilitating the following discussion, the farther down a record is shown within in-memory cache 130, the earlier that record was committed. For example, data records 112B-E were committed before truncate record 116. As mentioned, in-memory cache 130 may be flushed periodically in response to a trigger event, such as the cache becoming full, and thus records 112 and 116 may remain within in-memory cache 130 for a period of time, even after they have been committed.

During operation, database application 140 may receive a transaction request to execute a transaction that includes accessing a data record 112 for a specified key 310 (e.g., key 310A). When attempting to access a data record 112 for key 310A, in various embodiments, database application 140 initially checks for truncate records 116 that correspond to the tenant and table of key 310A (i.e., tenant A and table A). Accordingly, for the illustrated embodiment, database application 140 discovers truncate record 116 since it corresponds to tenant A and table A. As discussed for FIG. 2, a truncate record 116 can specify an epoch 220 that identifies a time period in system 100 and can take the form of an XCN. After locating truncate record 116, in various embodiments, database application 140 searches for a data record 112 that corresponds to key 310A and has been timestamped with an XCN that is greater than (or, in other embodiments, less than) the XCN of truncate record 116, indicating that that data record 112 was committed after truncate record 116. For the illustrated embodiment, data record 112A corresponds to key 310A and was committed after truncate record 116. As a result, database application 140 reads data record 112A and may return it to a requestor as part of executing the transaction. In various cases, when performing a record lookup for a key 310, such as key 310D, database application 140 may locate a data record 112 that corresponds to that key 310 but was committed prior to truncate record 116. Accordingly, in various embodiments, database application 140 does not return, or otherwise use, that data record 112 (e.g., data record 112D).

In various cases, database application 140 may receive a request to perform a key range lookup/scan. Consequently, in various embodiments, database application 140 returns a set of data records 112 that fall within the specified key range and are timestamped with an XCN that is greater than the XCN specified by epoch 220 of truncate record 116. For example, database application 140 may receive a request to return data records 112 corresponding to tenant A and table A. As a result, database application 140 may return data record 112A but not data records 112B and 112D as they were committed prior to truncate record 116. Database application 140 may also not return, or otherwise use in a transaction, data records 112 corresponding to tenant A and table A that are stored in database 110.

Figure 3B:
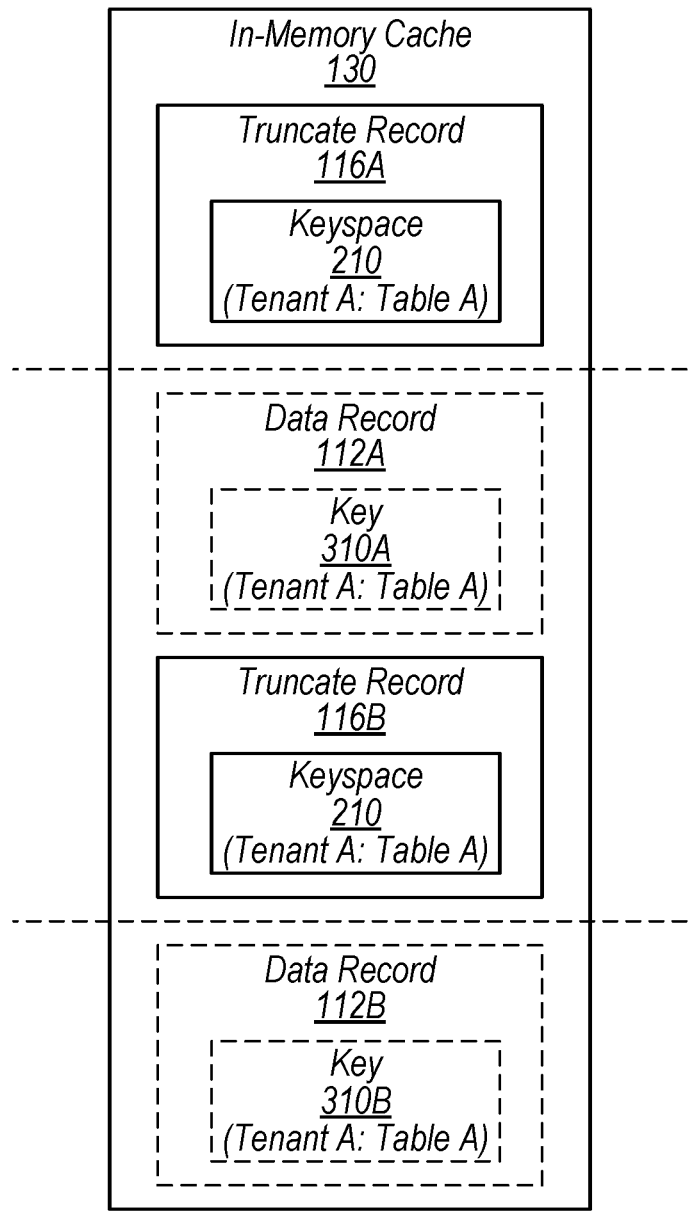
FIG. 3B is a block diagram illustrating example elements of an interaction in which the database application writes multiple truncate records into the in-memory cache, according to some embodiments.

Turning now to FIG. 3B, a block diagram of an example interaction in which database application 140 writes multiple truncate records 116 to in-memory cache 130 is shown. In the illustrated embodiment, in-memory cache 130 stores data records 112A-B and truncate records 116A-B. As part of processing a transaction, database application 140 may initially write data record 112B into in-memory cache 130 and commit it. As shown, data record 112B includes a key 310B that indicates that data record 112B belongs to tenant A and table A. At a later point in time, database application 140 may write truncate record 116B that truncates the data records 112 of tenant A from table A, including data record 112B. Since database application 140 can observe truncate records 116 stored in in-memory cache 130 and determine which data records 112 have not been truncated, in various embodiments, database application 140 is permitted to write data records 112 for a keyspace 210 that has been truncated before the associated truncate record 116 has been flushed. As such, after writing truncate record 116B, database application 140 writes data record 112A into in-memory cache 130 and commits it. As shown, data record 112A includes a key 310A that indicates that data record 112A belongs to tenant A and table A. Before truncate record 116B has been flushed, database application 140 writes and commits truncate record 116A to in-memory cache 130. Accordingly, in various embodiments, multiple truncate records 116 can be stacked in in-memory cache 130 for the same tenant and the same table 114. That is, a tenant may be truncated from a table 114 multiple times without a flush in between truncate records 116 commits for that tenant.

In various cases, when performing a single key/key range lookup, database application 140 may encounter multiple truncate records 116 in in-memory cache 130 that are for the same tenant and table 114. Database application 140, in various embodiments, determines which of the multiple truncate records 116 should be used for the lookup by determine which one of the truncate records 116 specifies the latest epoch 220. For the illustrated embodiment for example, database application 140 may determine that truncate record 116A was committed subsequent to truncate record 116B based on their epoch 220. As such, when determining whether a data record 112 has been truncated, database application 140 may compare the timestamped XCN of a data record 112 against the XCN of the epoch 220 of truncate record 116A and not truncate record 116B.

Figure 3C:
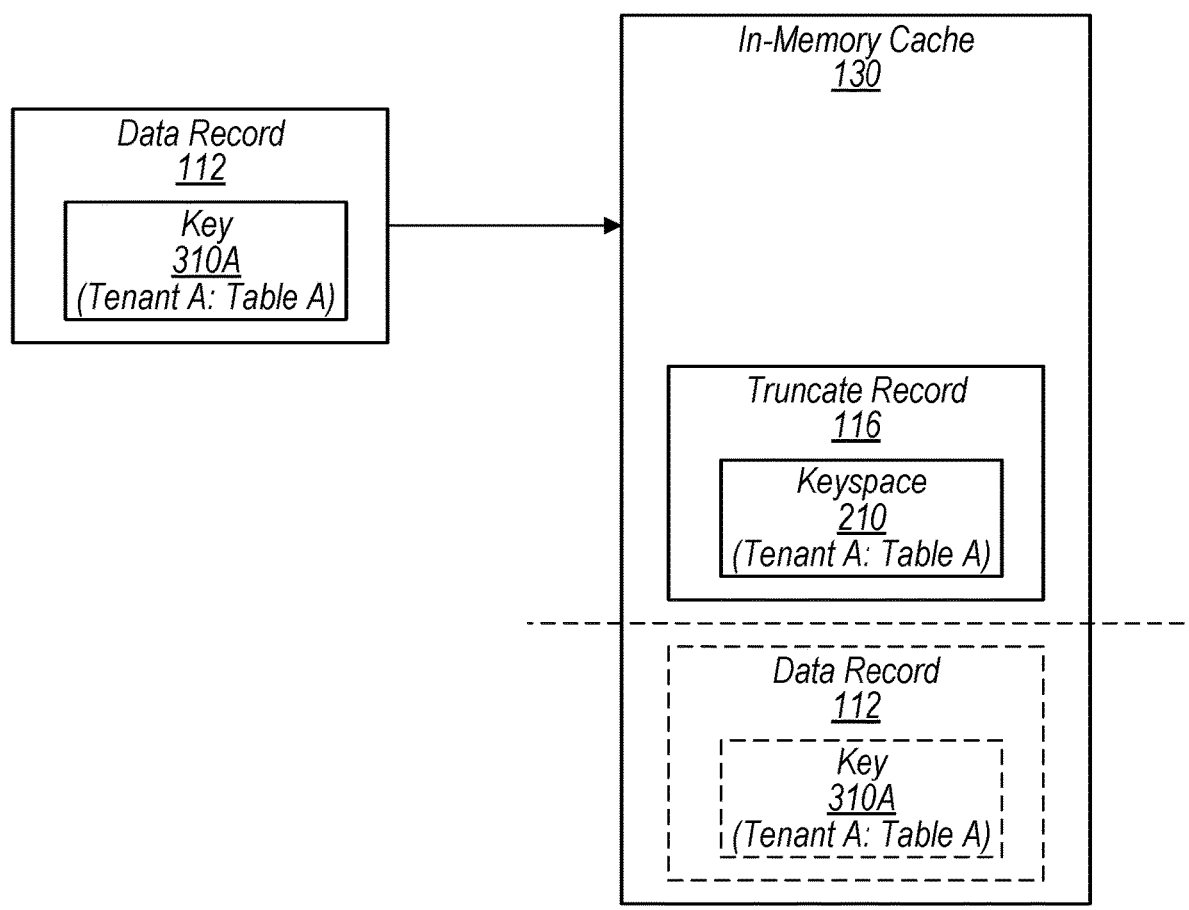
FIG. 3C is a block diagram illustrating example elements of an interaction in which the database application writes multiple data records with the same key into the in-memory cache, according to some embodiments.

Turning now to FIG. 3C, a block diagram of an example interaction in which database application 140 writes two data records 112 with the same key 310A to in-memory cache 130 is shown. In various embodiments, as a part of implementing transactional guarantees, database application 140 may perform duplicate checks involving data records 112. For example, when flushing data records 112 to database 110, database application 140 may ensure that only the latest data record 112 of a set of data records 112 having the same key 310 is flushed from in-memory cache 130. In some cases, database application 140 might not permit data records 112 of the same key 310 to be written to in-memory cache 130 without a flush. When performing a duplicate check, in various embodiments, database application 140 does not consider data records 112 that have been truncated by a truncate record 116. Accordingly, for the illustrated embodiment, when writing and/or flushing the data record 112 shown at the top (which includes key 310A), database application 140 may not consider the data record 112 shown in in-memory cache 130 for a duplicate check.

Figure 3D:
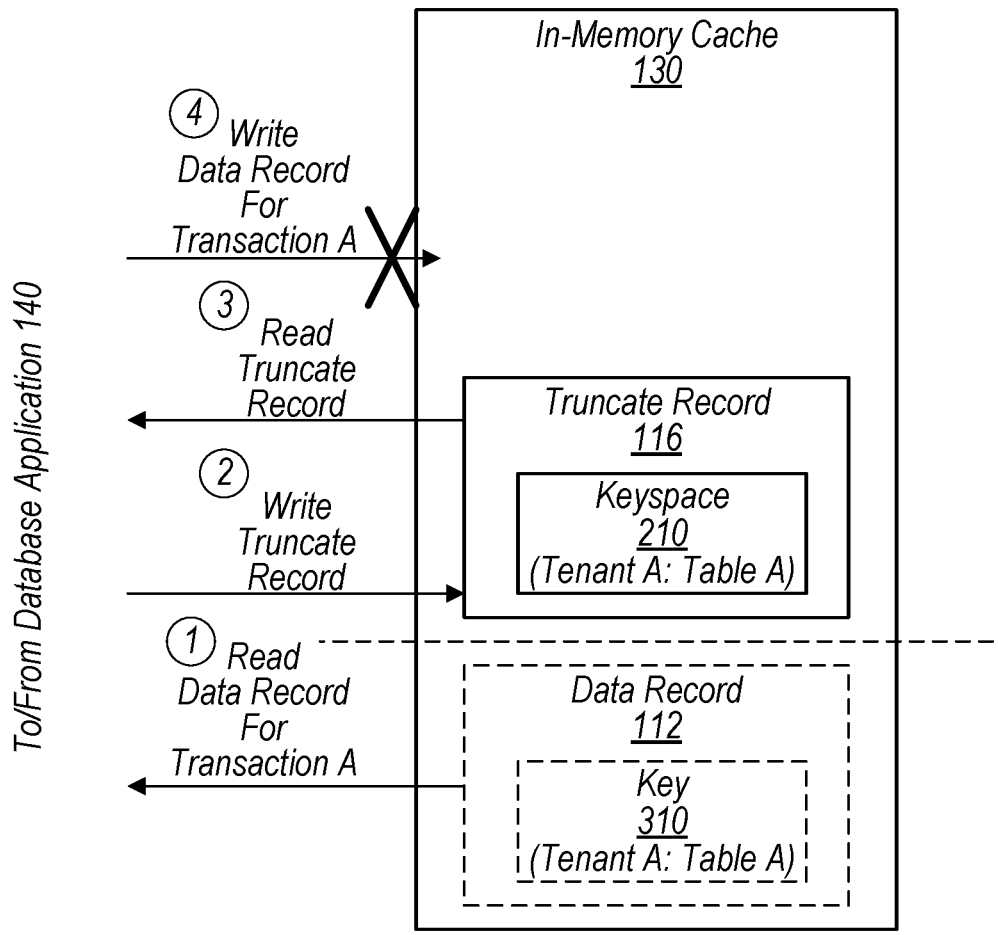
FIG. 3D is a block diagram illustrating example elements of an interaction in which the database application is prevented from performing a transaction across a truncate boundary, according to some embodiments.

Turning now to FIG. 3D, a block diagram of an example interaction in which database application 140 is prevented from performing a transaction "A" across a truncate boundary is shown. In the illustrated embodiment, in-memory cache 130 includes a data record 112 and a truncate record 116 that truncates that data record 112. In some cases, a transaction might take a considerable amount of time to complete (e.g., an hour) and thus certain situations can arise that may break transactional guarantees. In particular, a long-running transaction might read a data record 112 and then later use that data record 112 after it has been truncated. As a result, there may be data inconsistencies in system 100. As depicted for example, database application 140 reads data record 112 for transaction A and then subsequently writes truncate record 116 that causes data record 112 to be truncated. In order to prevent transaction A from using data record 112 to make a change within system 100 (e.g., by writing a new data record 112 based on information extracted from data record 112), in various embodiments, transactions observe truncate records 116 that are committed after snapshot times assigned to those transactions. In some embodiments, when a transaction is initiated, the transaction is assigned a snapshot XCN that determines what records are visible to that transaction. Records with an XCN that occurs after the snapshot XCN may not be visible or accessible to the transaction. A truncate record 116, however, may be visible to a transaction independent of the transaction's snapshot XCN. In various embodiments, when writing a data record 112 for a transaction, database application 140 determines whether the snapshot XCN for that transaction is less than any truncate record 116 corresponding to the keyspace 210 of the data record 112. If a truncate record 116 is found that matches that criteria, then database application 140 may abort the transaction and return a snapshot violation error. As shown for example, transaction A is prevented from writing a data record 112 after reading data record 112 because truncate record 116 was committed between the read and the write by transaction A.

Figure 4:
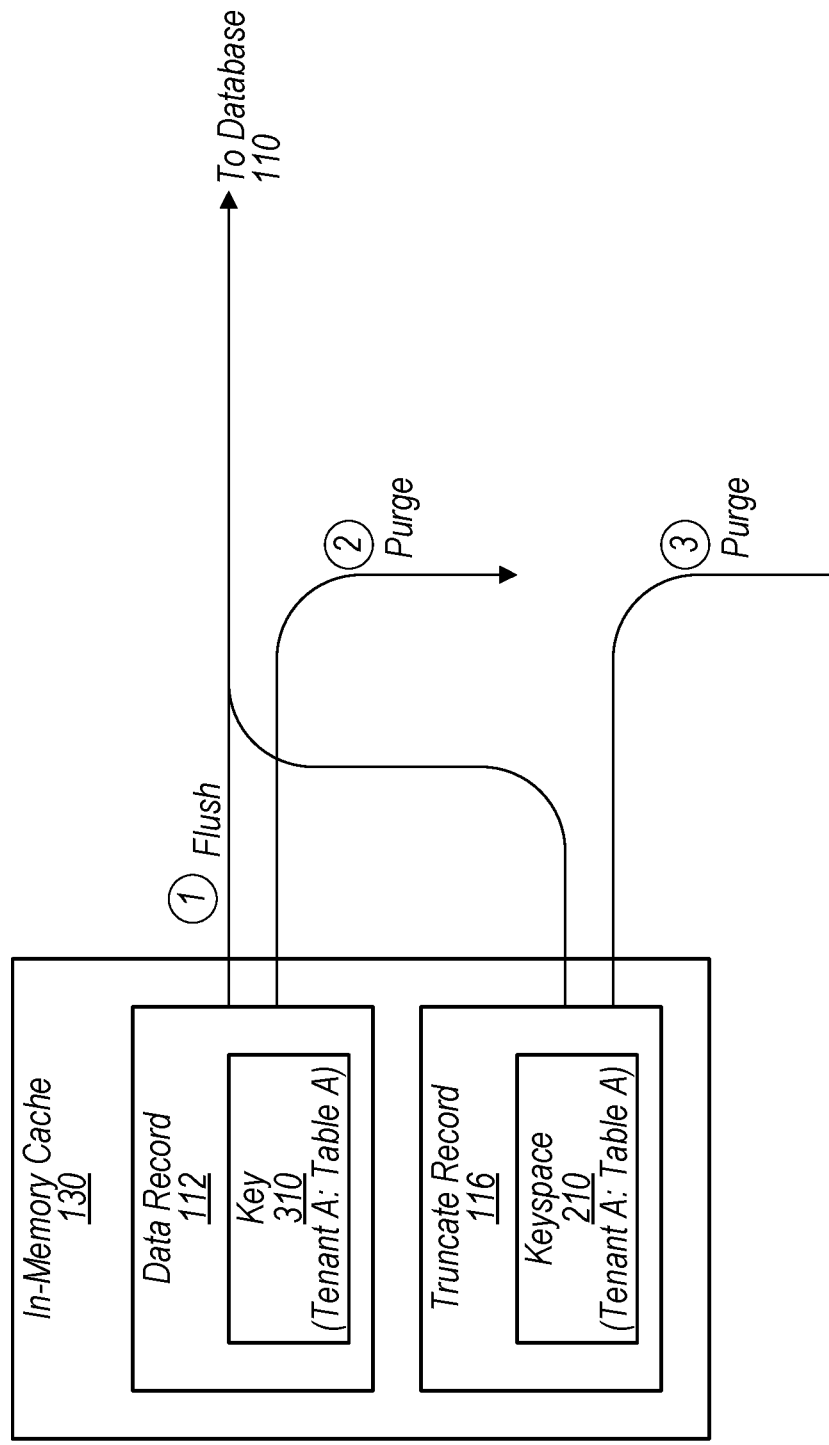
FIG. 4 is a block diagram illustrating example elements of an interaction in which in-memory cache is flushed and purged, according to some embodiments.

Turning now to FIG. 4, a block diagram of an example interaction in which in-memory cache 130 is flushed and purged is depicted. In the illustrated embodiment, in-memory cache 130 includes a data record 112 and a truncate record 116, both of which correspond to the same tenant and table 114. The illustrated embodiment may be implemented differently than shown. As an example, the flush and the purge may be part of the same operation as opposed to a flush operation and a separate purge operation.

As mentioned, in some embodiments, committed records can remain within in-memory cache 130 for a period of time until a triggering event, such as in-memory cache 130 becoming full. In response to that triggering event occurring, in various embodiments, in-memory cache 130 is first flushed and then purged. As used herein, the term "flush" when used in relation to in-memory cache 130 refers to the process of copying a set of records from in-memory cache 130 to another destination (e.g., database 110). A flush does not have to copy all records in in-memory cache 130 but instead may involve only a subset of records (e.g., records whose XCN falls within a XCN range specified for the flush). A used herein, the term "purge" when used in relation to in-memory cache 130 refers to the process of removing a set of records from in-memory cache 130. A purge does not have to remove all records in in-memory cache 130 but instead may remove only a subset of records.

In order to ensure transactional consistency, in various embodiments, truncate records 116 are purged after their associated data records 112. In particular, if a truncate 116 is purged before its associated data records 112, then a scenario can arise in which a transaction does not observe the truncate record 116 (since it has been purged) and accesses a data record 112 that has been truncated by that truncate record 116. Accordingly, to prevent that scenario, in various embodiments, data records 112 are removed from in-memory cache 130 first and then truncate records 116 are removed so that a transaction cannot read a data record 112 without observing a corresponding truncate record 116 (if one was committed). As depicted, data record 112 and truncate record 116 are both flushed to database 110 and then data record 112 is purged prior to truncate record 116 being purged. Since truncate record 116 is purged after data record 112, a transaction may not access data record 112 without observing truncate record 116. In some embodiments, a truncate record 116 may not be purged until all running transactions with an XCN less than the XCN that is specified by the epoch 220 of the truncate record 116 have been completed.

Figure 5:
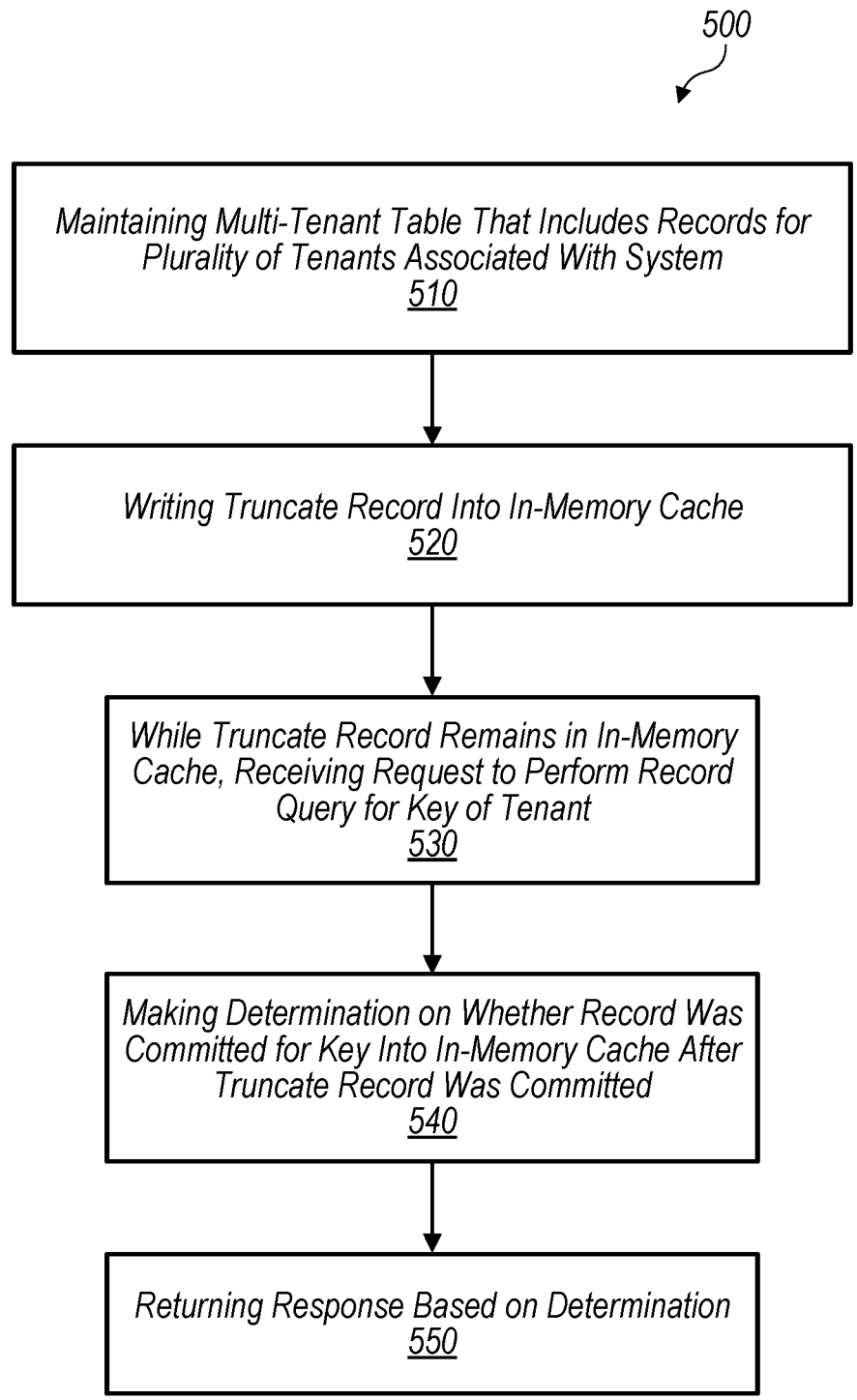
FIG. 5-6 are flow diagrams illustrating example methods relating to truncating a tenant from a multi-tenant table, according to some embodiments.

Turning now to FIG. 5, a flow diagram of a method 500 is shown. Method 500 is one embodiment of a method performed by a database node (e.g., database node 120) to truncate a tenant from a multi-tenant table (e.g., table 114) and to process a database transaction in view of truncating the tenant. Method 500 may be performed by executing program instructions that are stored on a non-transitory computer-readable medium. In some embodiments, method 500 includes more or less steps than shown. For example, method 500 may include a step in which another tenant is truncated from the multi-tenant table.

Method 500 begins in step 510 with the database node maintaining a multi-tenant table that includes records (e.g., data records 112) for a plurality of tenants (e.g., tenant A and tenant B) associated with the system (e.g., system 100) that includes the database node. Maintaining the multi-tenant table may include writing a record for a given one of plurality of tenants into an in-memory cache (e.g., in-memory cache 130) of the database node and then performing, in response to a trigger event, a flush operation to flush the record from the in-memory cache to a shared storage (e.g., database 110) of the system.

In step 520, the database node writes a truncate record (e.g., a truncate record 116) into the in-memory cache that truncates a tenant from the multi-tenant table such that records (e.g., data records 112) of the tenant having a timestamp indicating a time before the truncate record cannot be accessed as part of a record query. The truncate record may specify a keyspace (e.g., a keyspace 210) denoting the tenant within the multi-tenant table. Prior to writing the truncate record, the database node may write, into the in-memory cache, a set of records to the multi-tenant table for the tenant and the truncate record may truncate that set of records. The database node, in various embodiments, purges the set of records from the in-memory cache before purging the truncate record. The purging of the set of records and the truncate record may be performed after performing a flush operation to flush the set of records and the truncate record to the shared storage of the system. The truncate record may include a timestamp that denotes a time (e.g., an epoch 220). Before purging the truncate record from the in-memory cache, the database node may ensure that no transactions having a snapshot timestamp denoting a time before the time of the truncate record are being processed. In various cases, transactions having a snapshot timestamp denoting a time before the time that is identified by the truncate record can observe the truncate record.

In step 530, while the truncate record remains in the in-memory cache, the database node receives a request to perform a record query for a key of the tenant. In some cases, the database node may receive a request to perform a scan lookup for a keyspace of the tenant. In step 540, while the truncate record remains in the in-memory cache, the database node makes a determination on whether a record was committed for the key in the in-memory cache after the truncate record was committed. In step 550, while the truncate record remains in the in-memory cache, the database node returns a response based on the determination. The response may include all the records of the tenant that were committed in the in-memory cache after the truncate record was committed. In some cases, while the truncate record remains in the in-memory cache, the database node may write, into the in-memory cache, a set of records to the multi-tenant table for the tenant and later write another truncate record that truncates the set of records. The in-memory cache may concurrently store both truncate records.

In some cases, the database node may receive a request to write a first record for a particular key of the tenant. While the truncate record remains in the in-memory cache, the database node may determine whether a second record was written into the in-memory cache for the particular key. In response to determining that a second record was written but truncated by the truncate record, the database node may write the first record into the in-memory cache. The database node may receive a request to perform a transaction involving writing a record. In response to determining that the transaction is associated with a timestamp indicating a time before the truncate record, the database system may cause the transaction to be aborted.

Figure 6:
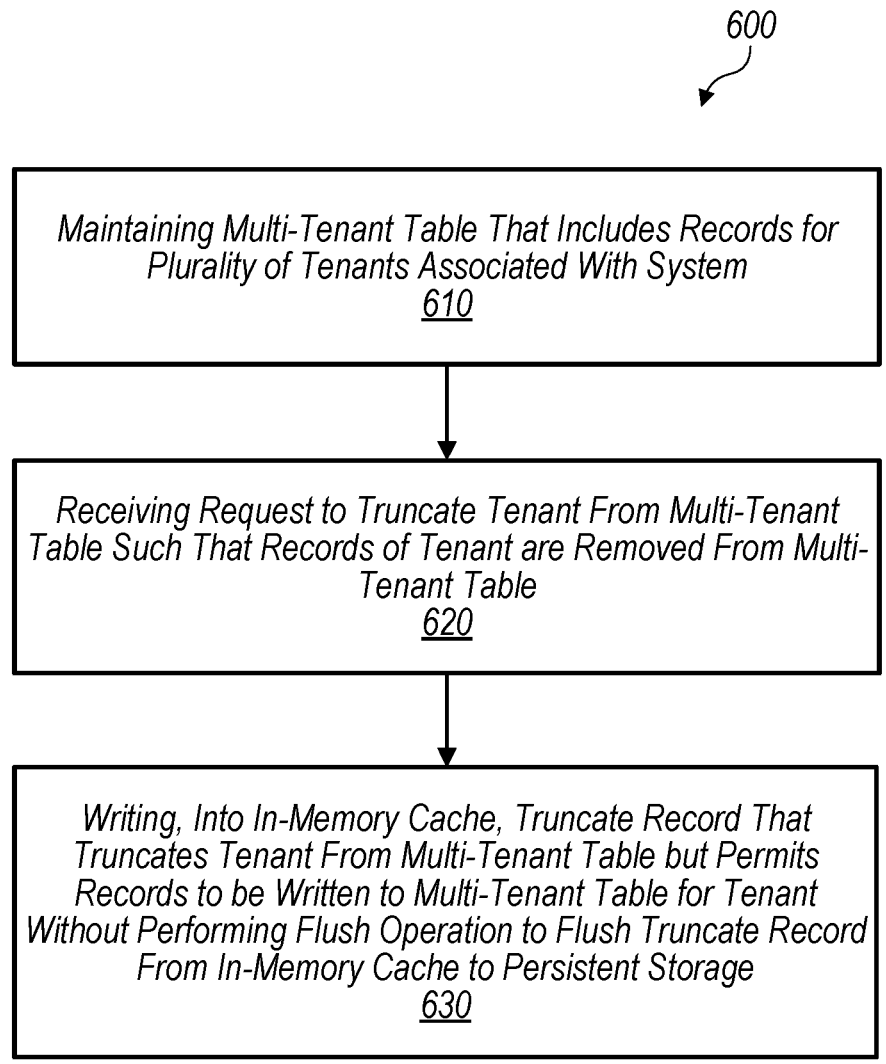

Turning now to FIG. 6, a flow diagram of a method 600 is shown. Method 600 is one embodiment of a method performed by a database node (e.g., database node 120) to truncate a tenant from a multi-tenant table (e.g., table 114) and to process a database transaction in view of truncating the tenant. Method 600 may be performed by executing program instructions that are stored on a non-transitory computer-readable medium. In some embodiments, method 600 includes more or less steps than shown. For example, method 600 may include a step in which another tenant is truncated from the multi-tenant table.

Method 600 begins in step 610 with the database node maintaining a multi-tenant table (e.g., a table 114) that includes records (e.g., data records 112) for a plurality of tenants associated with the system (e.g., system 100) that includes the database node. Maintaining the multi-tenant table may include writing a record for a given tenant into an in-memory cache of the database node and performing a flush operation to flush the record from the in-memory cache to a persistent storage (e.g., database 110) of the system. In step 620, the database node receives a request to truncate a tenant from the multi-tenant table such that records of the tenant are removed from the multi-tenant table.

In step 630, the database node writes, into the in-memory cache, a truncate record (e.g., a truncate record 116) that truncates the tenant from the multi-tenant table but permits records to be written to the multi-tenant table for the tenant without performing the flush operation to flush the first truncate record from the in-memory cache to the persistent storage. The truncate record may specify a keyspace (e.g., keyspace 210) that identifies the tenant and the multi-tenant table. In some cases, the database node may write, into the in-memory cache, another truncate record that truncates the tenant from a different multi-tenant table. The in-memory cache may store both truncate records at the same time. Prior to removing the truncate record from the in-memory cache, the database node may ensure that all transactions associated with a timestamp denoting a time that is before a time identified by the truncate record have been completed.

The database node may receive a request to perform a record lookup for a key and then process the request to perform the record lookup. Processing may include the database node accessing, from a plurality of truncate records associated with the multi-tenant table, a truncate record with a timestamp denoting that the truncate record is the latest written truncate record of the plurality of truncate records.

Exemplary Multi-Tenant Database System

Figure 7:
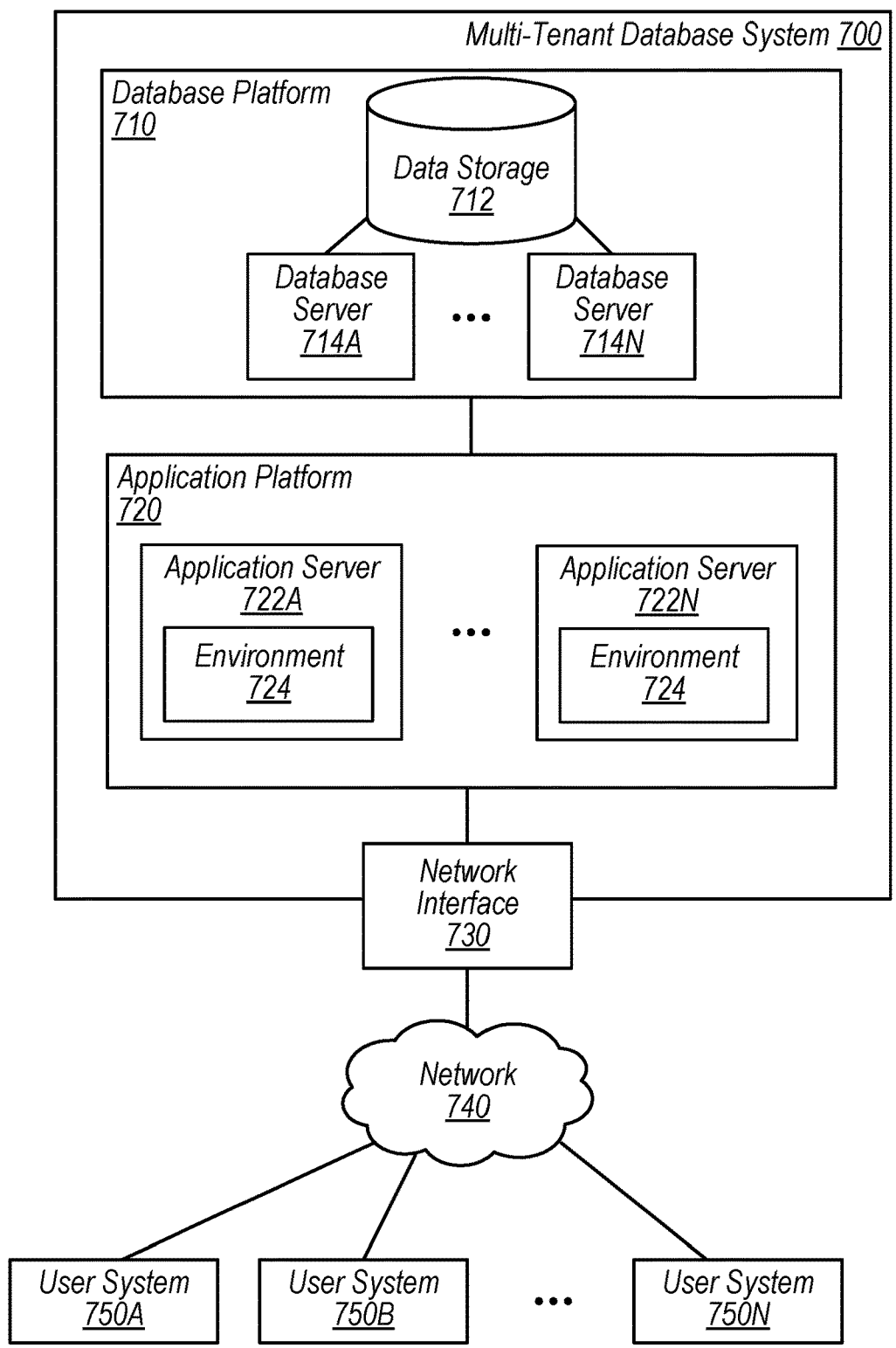
FIG. 7 is a block diagram illustrating elements of a multi-tenant system, according to some embodiments.

Turning now to FIG. 7, an exemplary multi-tenant database system (MTS) 700 in which various techniques of the present disclosure can be implemented is shown—e.g., system 100 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database (e.g., database 110) comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files that include one or more database records (e.g., data records 112) having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 712 is organized as part of a log-structured merge-tree (LSM tree). An LSM tree normally includes two high-level components: an in-memory buffer and a persistent storage. In operation, a database server 714 may initially write database records into a local in-memory buffer before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. A database server 714 may correspond to database node 120. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree—database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VB Script.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
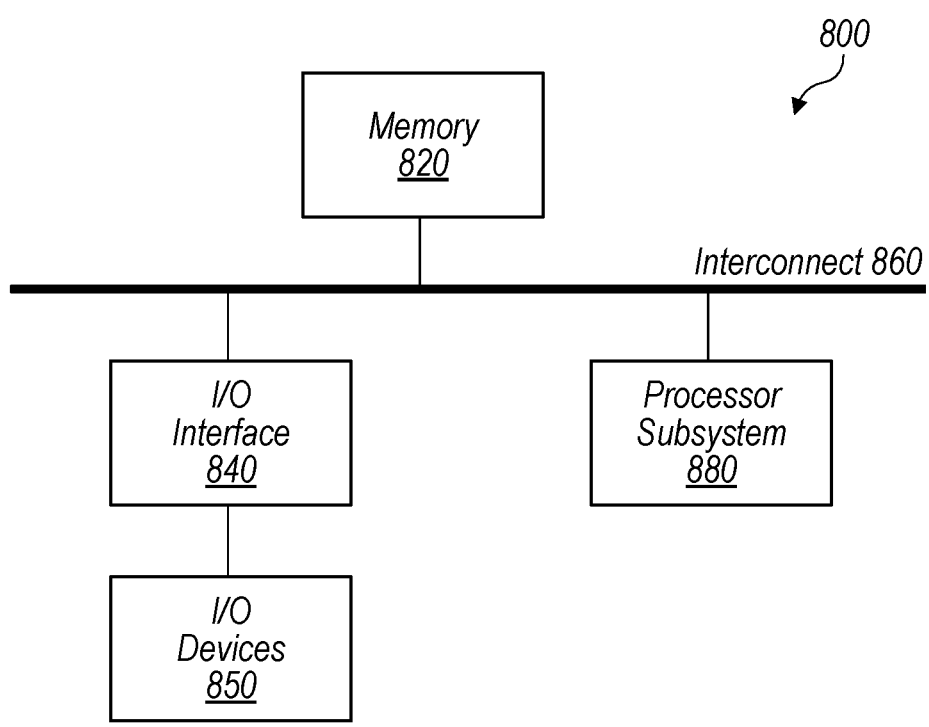
FIG. 8 is a block diagram illustrating elements of a computer system for implementing various systems described in the present disclosure, according to some embodiments.

Turning now to FIG. 8, a block diagram of an exemplary computer system 800, which may implement system 100, database 110, database node 120, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement in-memory cache 130 and database application 140 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   maintaining, by a database node of a system, a multi-tenant table that includes records for a plurality of tenants associated with the system, wherein the maintaining includes writing a record for a given one of the plurality of tenants into an in-memory cache of the database node and performing, in response to a trigger event, a flush operation to flush the record from the in-memory cache to a shared storage of the system;
   writing, by the database node, a first truncate record into the in-memory cache, wherein the first truncate record truncates a tenant from the multi-tenant table such that records within a keyspace representing the tenant that have a timestamp indicating a time before the first truncate record cannot be accessed as part of a record query, wherein the first truncate record specifies the keyspace; and
   while the first truncate record remains in the in-memory cache and before performing a flush operation to flush the first truncate record to the shared storage after writing the first truncate record, the database node:
      writing, to the in-memory cache, a set of records having keys within the keyspace, wherein the set of records includes data of the tenant;
      receiving a request to perform a record query for a key of the tenant;
      making a determination that a particular one of the set of records corresponds to the key and was committed in the in-memory cache after the first truncate record was committed; and
      returning a response that includes the particular record.

2. The method of claim 1, further comprising:
   while the first truncate record remains in the in-memory cache, the database node writing a second truncate record that truncates the set of records, wherein the in-memory cache concurrently stores the first and second truncate records.

3. The method of claim 1, further comprising:
   prior to writing the first truncate record, the database node writing, into the in-memory cache, one or more records to the multi-tenant table for the tenant, wherein the first truncate record truncates the one or more records; and purging, by the database node, the one or more records from the in-memory cache before purging the first truncate record.

4. The method of claim 3, wherein the purging of the one or more records and the first truncate record is performed after performing the flush operation to flush the one or more records and the first truncate record to the shared storage of the system.

5. The method of claim 1, wherein the first truncate record includes a timestamp denoting a time, and wherein the method further comprises:

before purging the first truncate record from the in-memory cache, the database node ensuring that no transactions having a snapshot timestamp denoting a time before the time of the first truncate record are being processed.

6. The method of claim 1, wherein transactions having a snapshot timestamp denoting a time before a time identified by the first truncate record are able to observe the first truncate record.

7. The method of claim 1, further comprising:

receiving, by the database node, a request to write a first record for a particular key of the tenant; and while the first truncate record remains in the in-memory cache, the database node:

determining whether a second record was committed to the in-memory cache for the particular key; and in response to determining that the second record was committed but truncated by the first truncate record, writing the first record into the in-memory cache.

8. The method of claim 1, further comprising:

receiving, by the database node, a request to perform a transaction that involves writing a record; and in response to determining that the transaction is associated with a timestamp indicating a time before the first truncate record, causing the transaction to be aborted.

9. The method of claim 1, further comprising:

while the first truncate record remains in the in-memory cache, the database node:

receiving a request to perform a scan lookup for the keyspace of the tenant; and returning a response that includes all records of the tenant that were committed in the in-memory cache after the first truncate record was committed, wherein the first truncate record is the most recent truncate record committed to truncate the tenant from the multi-tenant table.

10. A non-transitory computer readable medium having program instructions stored thereon that are executable by a computer system to cause the computer system to perform operations comprising:

maintaining a multi-tenant table that includes records for a plurality of tenants, wherein the maintaining includes writing a record for a given one of plurality of tenants into an in-memory cache of the computer system and performing, in response to a trigger event, a flush operation to flush the record from the in-memory cache to a shared storage accessible to the computer system;

writing a first truncate record into the in-memory cache, wherein the first truncate record truncates a tenant from the multi-tenant table such that records within a keyspace representing the tenant that have a timestamp indicating a time before the first truncate record cannot be accessed as part of a record query, wherein the first truncate record specifies the keyspace; and while the first truncate record remains in the in-memory cache and before performing a flush operation to flush the first truncate record to the shared storage after writing the first truncate record:

writing, to the in-memory cache, a set of records having keys within the keyspace, wherein the set of records includes data of the tenant;

receiving a request to perform a record query for a key of the tenant;

making a determination that a particular one of the set of records corresponds to the key and was committed in the in-memory cache after the first truncate record was committed; and returning a response that includes the particular record.

11. The medium of claim 10, wherein the operations further comprise:

while the first truncate record remains in the in-memory cache:

writing a second truncate record that truncates the tenant from the multi-tenant table, wherein the in-memory cache stores the first and second truncate records, and wherein making the determination includes determining whether a record was committed for the key in the in-memory cache after the second truncate record.

12. The medium of claim 10, wherein the operations further comprise:

while the first truncate record remains in the in-memory cache:

receiving a request to perform a scan lookup for the keyspace; and returning a response having at least one record of the set of records.

13. The medium of claim 10, wherein the operations further comprise:

prior to purging the first truncate record from the in-memory cache, ensuring that all transactions associated with a timestamp denoting a time that is before a time identified by the first truncate record have been completed; and purging the first truncate record from the in-memory cache.

14. The medium of claim 10, wherein the operations further comprise:

purging, from the in-memory cache, records stored in the in-memory cache that were truncated by the first truncate record before purging the first truncate record.

15. A method, comprising:

maintaining, by a database node of a system, a multi-tenant table that includes records for a plurality of tenants associated with the system, wherein the maintaining includes writing a record for a given tenant into an in-memory cache of the database node and performing a flush operation to flush the record from the in-memory cache to a persistent storage of the system;

receiving, by the database node, a request to truncate a tenant from the multi-tenant table such that records within a keyspace representing the tenant are removed from the multi-tenant table; and writing, by the database node into the in-memory cache, a first truncate record that truncates the tenant from the multi-tenant table but permits records to be written to the multi-tenant table for the tenant without performing a particular flush operation to flush the first truncate record from the in-memory cache to the persistent storage; and while the first truncate record remains in the in-memory cache and before performing the particular flush operation to flush the first truncate record to the persistent storage after writing the first truncate record, the database node:
  writing, to the in-memory cache, a set of records having keys within the keyspace, wherein the set of records includes data of the tenant; and
  returning at least one of the set of records as part of processing a record request.

16. The method of claim 15, further comprising:
receiving, by the database node, a request to perform a record lookup for a key; and
processing the request to perform the record lookup, wherein the processing includes accessing, from a plurality of truncate records associated with the multi-tenant table, a truncate record with a timestamp denoting that the truncate record is the latest committed truncate record of the plurality of truncate records.

17. The method of claim 15, further comprising:
writing, by the database node into the in-memory cache, a second truncate record that truncates the tenant from a different multi-tenant table, wherein the in-memory cache stores the first and second truncate records.

18. The method of claim 15, further comprising:
prior to removing the first truncate record from the in-memory cache, the database node ensuring that all transactions associated with a timestamp denoting a time that is before a time identified by the first truncate record have been completed.

* * * * *